United States Patent
Yamaguchi et al.

(10) Patent No.: US 9,117,158 B2
(45) Date of Patent: Aug. 25, 2015

(54) IMAGE FORMING APPARATUS, IMAGE FORMING METHOD, AND NON-TRANSITORY COMPUTER READABLE MEDIUM

(71) Applicant: FUJI XEROX CO., LTD., Minato-ku, Tokyo (JP)

(72) Inventors: Yuya Yamaguchi, Kanagawa (JP); Nobuhide Kawabata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/912,470

(22) Filed: Jun. 7, 2013

(65) Prior Publication Data

US 2014/0104624 A1    Apr. 17, 2014

(30) Foreign Application Priority Data

Oct. 16, 2012   (JP) .................. 2012-228901

(51) Int. Cl.
*G06K 15/02* (2006.01)
*G06K 15/00* (2006.01)

(52) U.S. Cl.
CPC .......... *G06K 15/1843* (2013.01); *G06K 15/005* (2013.01); *G06K 15/1822* (2013.01)

(58) Field of Classification Search
CPC ............................................... G06K 15/1843
USPC .................. 358/1.1–1.9, 1.11–1.18
See application file for complete search history.

(56) References Cited

U.S. PATENT DOCUMENTS

| | | | |
|---|---|---|---|
| 6,181,436 B1 * | 1/2001 | Kurachi | 358/1.15 |
| 8,593,675 B2 * | 11/2013 | Takahashi et al. | 358/1.15 |
| 2003/0202716 A1 | 10/2003 | Nishikawa et al. | |
| 2004/0243612 A1 * | 12/2004 | Bailey | 707/101 |
| 2005/0073709 A1 * | 4/2005 | Kujirai et al. | 358/1.14 |
| 2006/0061616 A1 * | 3/2006 | Yamazaki | 347/19 |
| 2010/0238517 A1 * | 9/2010 | Kashiwa | 358/452 |
| 2011/0252381 A1 * | 10/2011 | Chaudhri | 715/838 |
| 2012/0297302 A1 * | 11/2012 | Barraclough et al. | 715/716 |
| 2013/0030689 A1 * | 1/2013 | Yamaguchi | 701/409 |

FOREIGN PATENT DOCUMENTS

| | | | |
|---|---|---|---|
| JP | 2000-083161 A | | 3/2000 |
| KR | 20080050742 | * | 1/2008 |

OTHER PUBLICATIONS

Communication dated Aug. 28, 2014 from the Australian Patent Office in counterpart application No. 2013206515.
Communication dated Jan. 2, 2015 from the Australian Patent Office in counterpart application No. 2013206515.

* cited by examiner

*Primary Examiner* — King Poon
*Assistant Examiner* — Ibrahim Siddo
(74) *Attorney, Agent, or Firm* — Sughrue Mion, PLLC (57) ABSTRACT

An image forming apparatus includes a print request combining unit and a reduced-size image display unit. The print request combining unit combines multiple print requests to generate one print request. The reduced-size image display unit reduces sizes of images of to-be-displayed pages among pages to be formed in accordance with the one print request generated by the print request combining unit, and displays reduced-size images of the to-be-displayed pages. The reduced-size image display unit extracts at least one to-be-displayed page from each set of to-be-printed pages specified in a corresponding one of the multiple print requests having been combined by the print request combining unit, and displays reduced-size images of the extracted to-be-displayed pages.

17 Claims, 11 Drawing Sheets

| ID | JOB NAME | STATE | NUMBER OF PAGES TO BE OUTPUT | ... | |
|---|---|---|---|---|---|
| 1 | AAA | WAITING | 1 | ... | |
| 2 | BBB | WAITING | 5 | ... | ⎫ |
| 3 | CCC | WAITING | 6 | ... | ⎬ COMBINE |
| 4 | DDD | WAITING | 10 | ... | |
| 5 | EEE | WAITING | 5 | ... | ⎭ |
| 6 | FFF | WAITING | 7 | ... | |
| 7 | GGG | WAITING | 4 | ... | |
| : | ... | ... | ... | ... | |

FIG. 4B

| ID | JOB NAME | STATE | NUMBER OF PAGES TO BE OUTPUT | ... | |
|---|---|---|---|---|---|
| 1 | AAA | WAITING | 1 | ... | |
| 2 | BBB | WAITING | 5 | ... | |
| 3 | CCC | WAITING | 6 | ... | |
| 4 | DDD | WAITING | 10 | ... | |
| 5 | EEE | WAITING | 5 | ... | |
| 6 | FFF | WAITING | 7 | ... | |
| 7 | GGG | WAITING | 4 | ... | |
| 8 | Build_AAA | WAITING | 27 | ... | ← COMBINED JOB |
| : | ... | ... | ... | ... | |

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-228901 filed Oct. 16, 2012.

BACKGROUND (i) Technical Field

The present invention relates to an image forming apparatus, an image forming method, and a non-transitory computer readable medium.

(ii) Related Art

The cover page and various other pages of a publication containing multiple pages (such as a newspaper, catalog, magazine, or book) are sometimes created by different people or created using different clients (applications, operating systems, or the like). When such a publication is printed by a printer, printing of the cover page and printing of various other pages are sometimes separately input as different jobs. To cope with this situation, there are provided printers that have a function of combining all jobs which are separately input to the printers for parts constituting one publication and that allow the user to flexibly set the combination order of the print jobs and the imposition. Also, a function is available that displays thumbnails of all pages so as to allow the user to visually check the content of a print job and perform a setting operation.

SUMMARY

According to an aspect of the invention, there is provided an image forming apparatus including a print request combining unit and a reduced-size image display unit. The print request combining unit combines multiple print requests to generate one print request. The reduced-size image display unit reduces sizes of images of to-be-displayed pages among pages to be formed in accordance with the one print request generated by the print request combining unit, and displays reduced-size images of the to-be-displayed pages. The reduced-size image display unit extracts at least one to-be-displayed page from each set of to-be-printed pages specified in a corresponding one of the multiple print requests having been combined by the print request combining unit, and displays reduced-size images of the extracted to-be-displayed pages.

BRIEF DESCRIPTION OF THE DRAWINGS

An exemplary embodiment of the present invention will be described in detail based on the following figures, wherein:

FIGS. 4A and 4B are tables each illustrating a list of print jobs (print requests) stored in a print request storage unit, and more specifically FIG. 4A illustrates the state before print jobs are combined, whereas FIG. 4B illustrates the state after a combined job has been generated;

DETAILED DESCRIPTION

Figure 1:
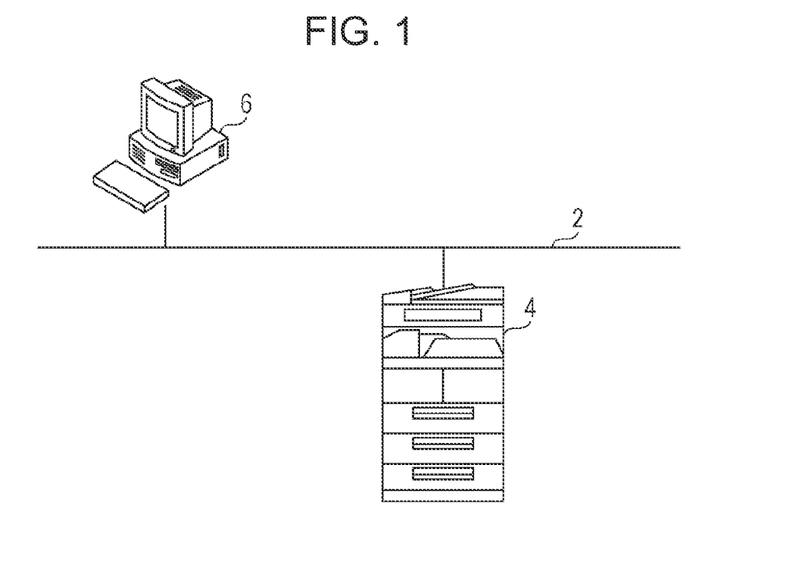
FIG. 1 illustrates the configuration of an image forming system according to an exemplary embodiment of the present invention.

An exemplary embodiment of the present invention will now be described in detail with reference to the accompanying drawings. FIG. 1 illustrates the configuration of an image forming system according to an exemplary embodiment of the present invention.

As illustrated in FIG. 1, the image forming system according to the exemplary embodiment of the present invention includes an image forming apparatus 4 and a terminal apparatus 6, which are connected to each other via a network 2. The terminal apparatus 6 generates a print job (a print request) and sends the generated print job to the image forming apparatus 4 via the network 2. The image forming apparatus 4 accepts a print job sent from the terminal apparatus 6 and outputs an image on a recording medium, such as paper, in accordance with the print job. Note that the image forming apparatus 4 has the print function and may additionally have another function, such as the scan function, the copy function, or the fax function.

As will be described below, the image forming apparatus 4 accepts multiple print jobs, combines the multiple accepted print jobs to generate one print job, and outputs images on recording media in accordance with the one print job. Also, only one terminal apparatus 6 is illustrated in FIG. 1 but there may be multiple terminal apparatuses 6. In this case, the image forming apparatus 4 may combine print jobs sent from the multiple terminal apparatuses 6 to generate one print job.

In the following description, one print job that is generated as a result of combining multiple print jobs is sometimes referred to as a combined job.

Figure 2:
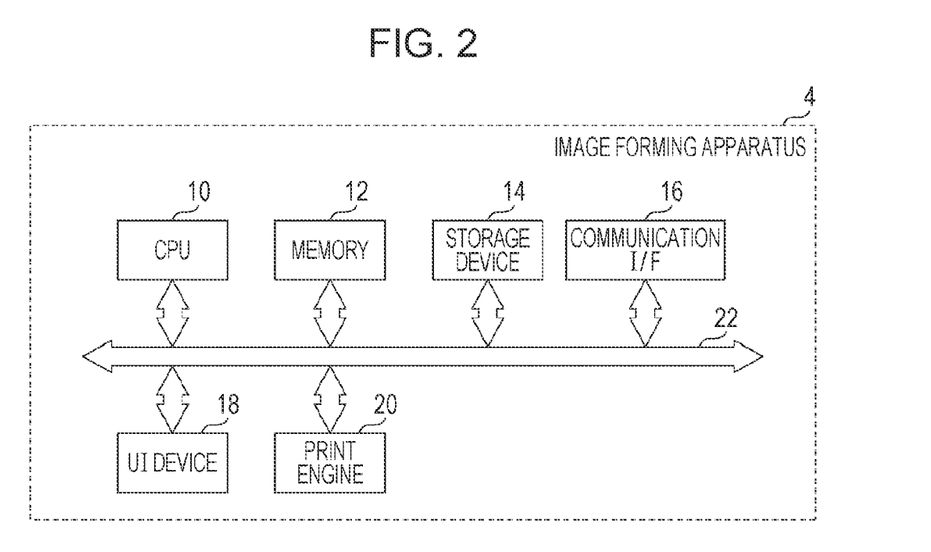
FIG. 2 illustrates the hardware configuration of an image forming apparatus according to the exemplary embodiment of the present invention.

FIG. 2 illustrates the hardware configuration of the image forming apparatus 4 of the image forming system according to this exemplary embodiment.

As illustrated in FIG. 2, the image forming apparatus 4 includes a central processing unit (CPU) 10, a memory 12, a storage device 14 such as a hard disk drive (HDD), a communication interface (I/F) 16 that exchanges data with an external device or the like via the network 2, a user interface (UI) device 18 including a touch panel or a liquid crystal display and a keyboard, and a print engine 20. These components are connected to each other via a control bus 22.

The CPU 10 executes a process in accordance with a control program stored in the memory 12 or the storage device 14 so as to control operations of the image forming apparatus 4.

Note that the description is given in this exemplary embodiment on assumption that the CPU 10 reads out and executes a control program stored in the memory 12 or the storage device 14 but the CPU 10 may be provided with the control program stored on a recording medium, such as a Compact Disc Read Only Memory (CD-ROM).

Figure 3:
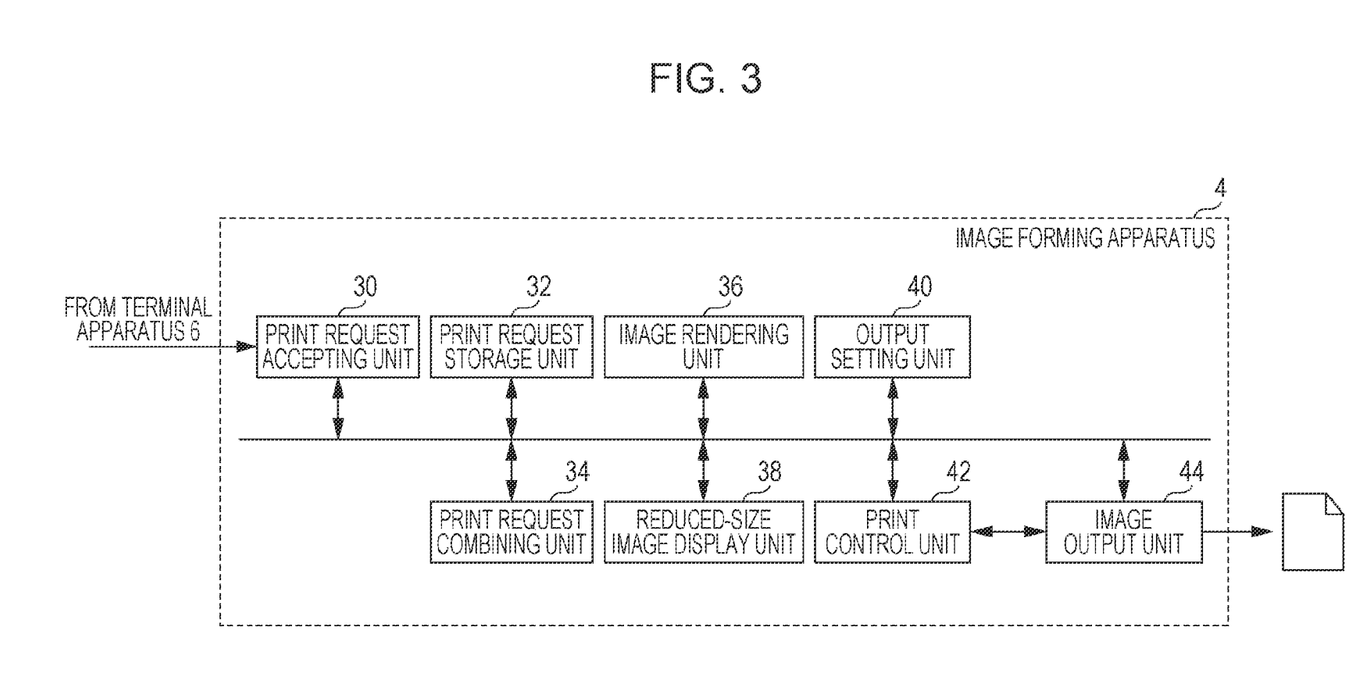
FIG. 3 illustrates the functional configuration of the image forming apparatus according to the exemplary embodiment of the present invention.

FIG. 3 illustrates the functional configuration of the image forming apparatus 4 that is implemented as a result of the control program being executed.

As illustrated in FIG. 3, the image forming apparatus 4 according to this exemplary embodiment includes a print request accepting unit 30, a print request storage unit 32, a print request combining unit 34, an image rendering unit 36, a reduced-size image display unit 38, an output setting unit 40, a print control unit 42, and an image output unit 44.

An image rendering process and an image output process are performed for a print job, whereby an image is formed on a recording medium. Here, the image rendering process is a process in which print data in the PostScript format or the like is converted into image data in the raster format. Also, the image output process is a process in which an image is printed on printing paper in accordance with generated image data.

The print request accepting unit 30 accepts a print job (a print request) sent from the terminal apparatus 6 and stores the print job in the print request storage unit 32.

The print request combining unit 34 combines multiple print jobs stored in the print request storage unit 32 to generate one print job. For example, the print request combining unit 34 combines multiple print jobs specified using the UI device 18.

Figure 4A:
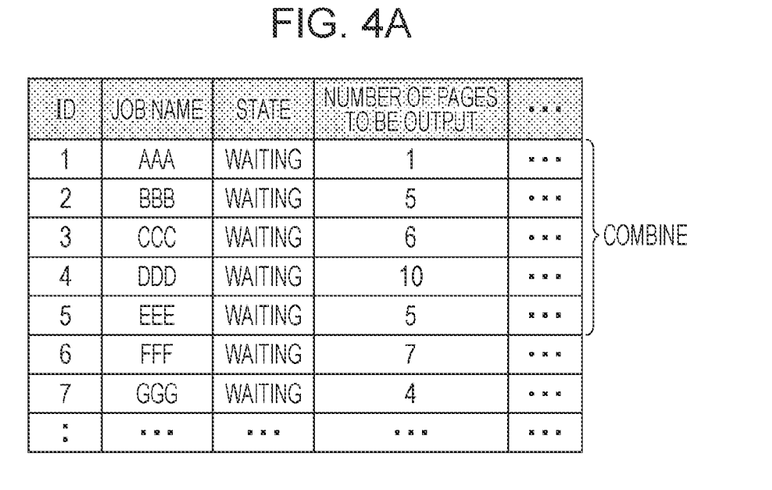
Figure 4B:
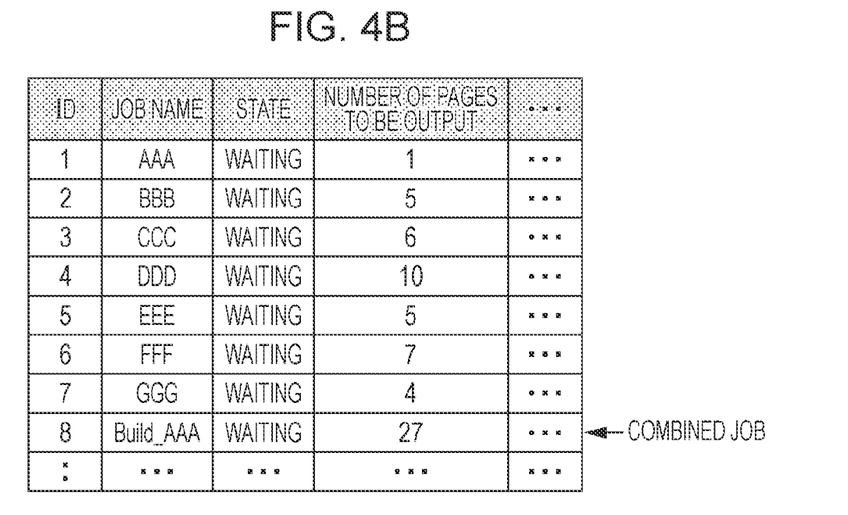

FIGS. 4A and 4B are tables each illustrating a list of print jobs stored in the print request storage unit 32. Specifically, FIG. 4A illustrates the state before print jobs are combined, whereas FIG. 4B illustrates the state after a combined job has been generated by the print request combining unit 34. In the example illustrated in FIGS. 4A and 4B, five print jobs "AAA" to "EEE" are combined and a combined job "Build_AAA" is consequently generated.

Multiple print jobs are sometimes input for a printed material containing multiple pages (for example, a newspaper, catalog, magazine, or book) in such a manner that print jobs are generated for individual content categories (such as the cover page and individual chapters). Such multiple print jobs are sometimes combined.

The image rendering unit 36 generates image data in a format suited to be output by the image output unit 44, in accordance with a print job stored in the print request storage unit 32.

The reduced-size image display unit 38 reduces the size of an image of a to-be-displayed page and displays a reduced-size image (a thumbnail) of the to-be-displayed page in accordance with image data generated by the image rendering unit 36. In the case of displaying reduced-size images for a combined job generated by the print request combining unit 34, the reduced-size image display unit 38 extracts at least one to-be-displayed page from each set of to-be-printed pages specified in a corresponding one of the print jobs that have been combined to constitute the combined job and displays reduced-size images of these extracted pages side by side. At this time, the reduced-size image display unit 38 displays reduced-size images on the UI device 18, for example. Also, the reduced-size image display unit 38 displays reduced-size images of all to-be-printed pages specified in an ordinary print job that is not a combined job.

The output setting unit 40 makes an output setting used by the image output unit 44. For example, the output setting unit 40 makes an output setting in accordance with an input operation that is performed using the UI device 18 on thumbnails displayed by the reduced-size image display unit 38. For example, the output setting unit 40 makes a setting for editing a combination order in which print jobs constituting a combined job are combined or a setting for editing the imposition of a combined job.

The print control unit 42 controls the image output unit 44 to perform an image output process for a print job.

The image output unit 44 outputs an image based on a print job under control of the print control unit 42.

Now, how reduced-size images are displayed for a combined job by the reduced-size image display unit 38 will be described.

As described above, in the case of displaying reduced-size images for a combined job, the reduced-size image display unit 38 extracts at least one page from each set of to-be-printed pages specified in a corresponding one of print jobs having been combined and displays reduced-size images of these extracted pages.

Figure 5:
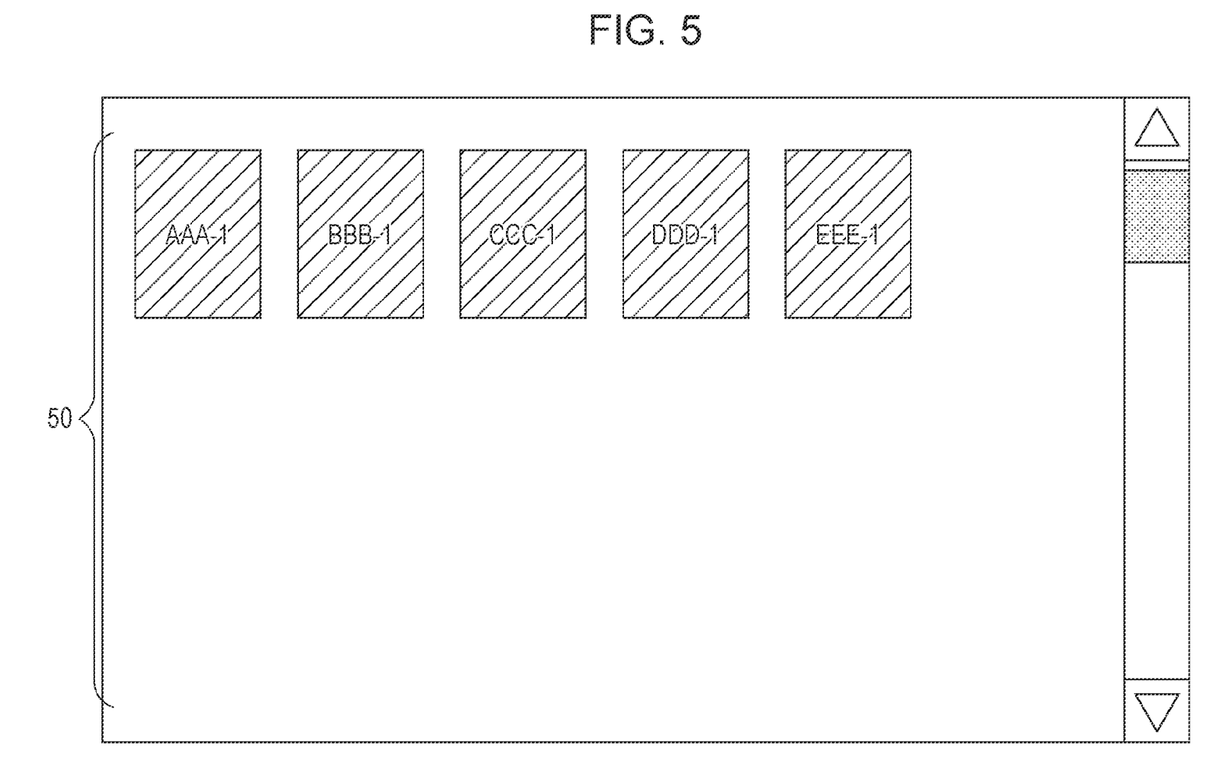
FIG. 5 is a schematic diagram illustrating an example of how reduced-size images are displayed for a combined job by a reduced-size image display unit.

FIG. 5 is a schematic diagram illustrating an example of how reduced-size images are displayed for a combined job by the reduced-size image display unit 38. Note that FIGS. 5 to 11 illustrate examples in which reduced-size images are displayed for the combined job "Build_AAA" obtained by combining the aforementioned print jobs "AAA" to "EEE", at a reduced-size image display area 50 of a display screen of the UI device 18. Hatched portions each represent a reduced-size image of a corresponding page. The name of the constituent print job and the page number in the constituent print job are shown at each hatched portion in a format "the job name-the page number" for explanatory purposes. However, a reduced-size image of the page of the print job resulting from rendering performed by the image rendering unit 36 is actually displayed.

In the example illustrated in FIG. 5, the reduced-size image display unit 38 extracts the initial page of each set of to-be-printed pages specified in a corresponding one of the print requests having been combined by the print request combining unit 34 and displays reduced-size images of the extracted initial pages. Specifically, the initial page of to-be-printed pages specified in the print job "AAA", the initial page of to-be-printed pages specified in the print job "BBB", the initial page of to-be-printed pages specified in the print job "CCC", the initial page of to-be-printed pages specified in the print job "DDD", and the initial page of to-be-printed pages specified in the print job "EEE" are extracted from the corresponding print jobs having been combined and reduced-size images of the extracted initial pages are displayed.

Figure 6:
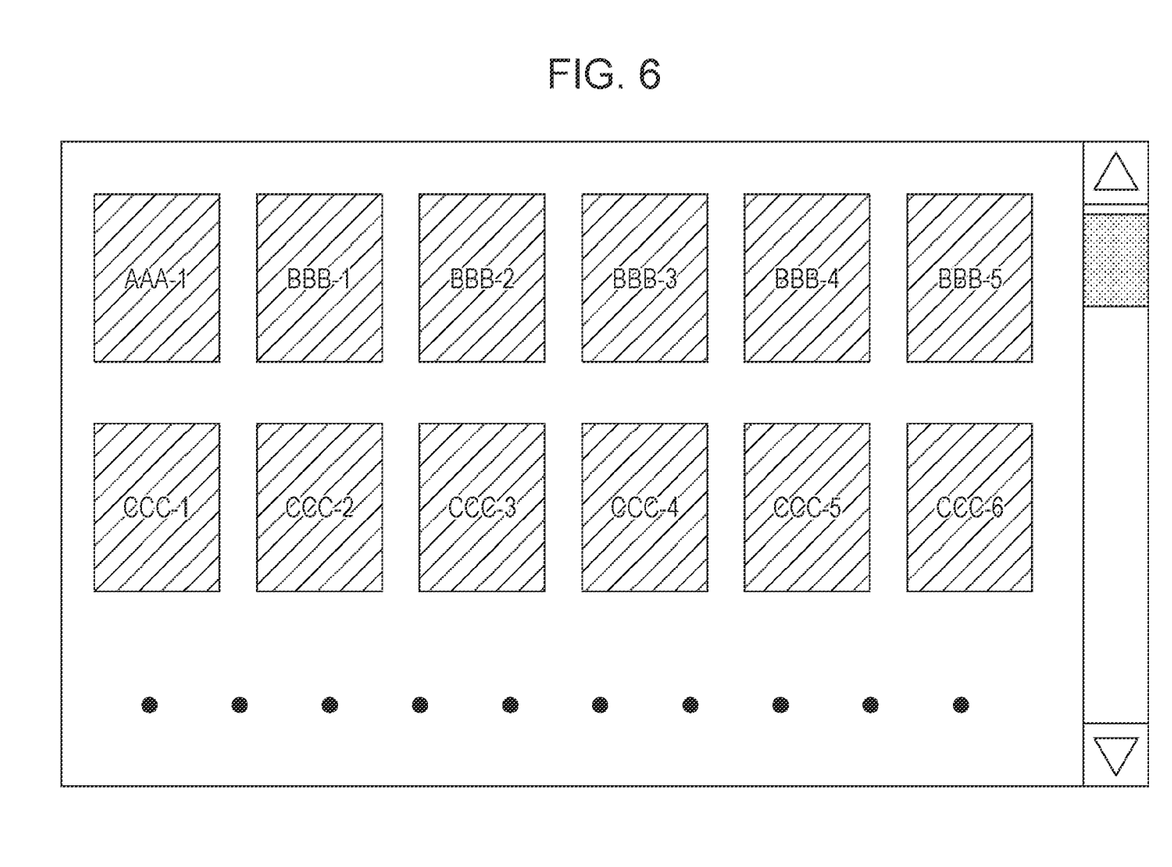
FIG. 6 is a schematic diagram illustrating a comparative example in which reduced-size images of all pages of the combined job are displayed.

In contrast, FIG. 6 is a schematic diagram illustrating a comparative example in which reduced-size images of all pages specified in the combined job are displayed. In the comparative example illustrated in FIG. 6, reduced-size images of all pages specified in the individual print jobs having been combined are displayed (as described above, "the job name-the page number" is shown in FIG. 6 but images are actually displayed). For example, even if the user wishes to briefly check print jobs constituting a combined job or to check sections of print jobs in order to change the combination order of the print jobs, it is more difficult to check such an item in the comparative example illustrated in FIG. 6 than in the example illustrated in FIG. 5.

Figure 7:
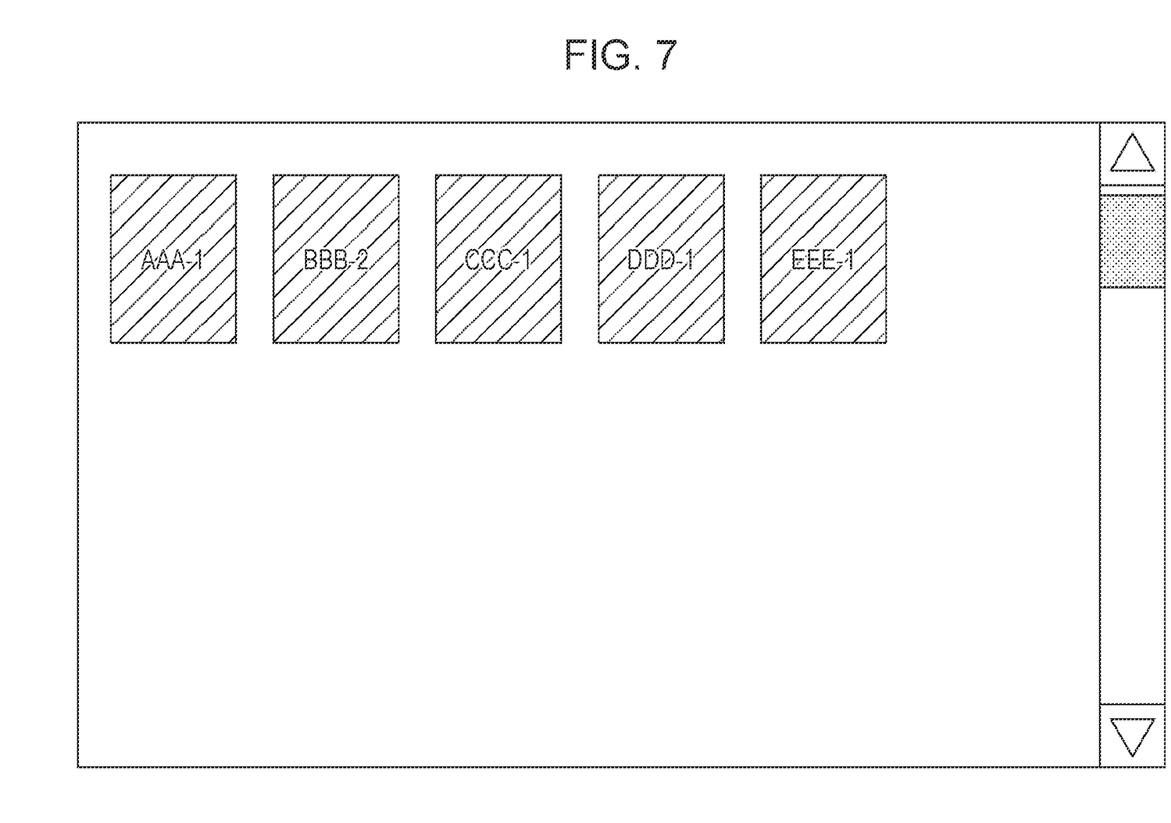
FIG. 7 is a schematic diagram illustrating an example in which the reduced-size image display unit displays a reduced-size image of the next page following the initial page instead of that of the initial page.

FIG. 7 is a schematic diagram illustrating an example in which the next page following the initial page is displayed instead of the initial page by the reduced-size image display unit 38.

FIG. 5 illustrates the example in which the initial pages are extracted for individual print jobs. However, in the case where the initial page is a blank page or a separator page, the reduced-size image display unit 38 may display a reduced-size image of the next page following the initial page as illustrated in FIG. 7. In the example illustrated in FIG. 7, a reduced-size image of the second page in the print job "BBB" is displayed because the initial page in the print job "BBB" is a blank page.

In the case where a drawing command for an extracted page satisfies a predetermined condition in this manner, the reduced-size image display unit 38 may extract the next page instead of the extracted page and may display a reduced-size image of the next page. For example, a result obtained by analyzing a drawing command for an extracted page satisfies a condition indicating a blank page or a separator page, the reduced-size image display unit 38 extracts the next page following the extracted page instead of the extracted page. Also, in the case where the extracted next page satisfies the condition indicating a blank page or a separator page, the reduced-size image display unit 38 may extract a page following the next page.

Alternatively, in a case where a result obtained by comparing a first page which is the initial page of to-be-printed pages specified in a first print job among the print jobs having been combined by the print request combining unit 34, with a second page which is the initial page of to-be-printed pages specified in a second print job following the first print job in the combination order of the print jobs satisfies a predetermined condition, the reduced-size image display unit 38 may display a reduced-size image of the next page following the second page instead of the second page for the second print job.

This will be described by taking the aforementioned combined job "Build_AAA" as an example. For example, in the case where both the initial page (the first page) of the print job "AAA" and the initial page (the second page) of the print job "BBB" which follows the print job "AAA" in the combination order are cover pages, a reduced-size image of the next page following the initial page is displayed for the print job "BBB" instead of the initial page (the cover page). Here, the case where the comparison result satisfies the predetermined condition may be, for example, a case where attributes (each indicating which of the cover page, the separator page, or the body page this page is) of the first and second pages specified in corresponding drawing commands are specific attributes (for example, the cover page or the separator page) that are the same.

Figure 8:
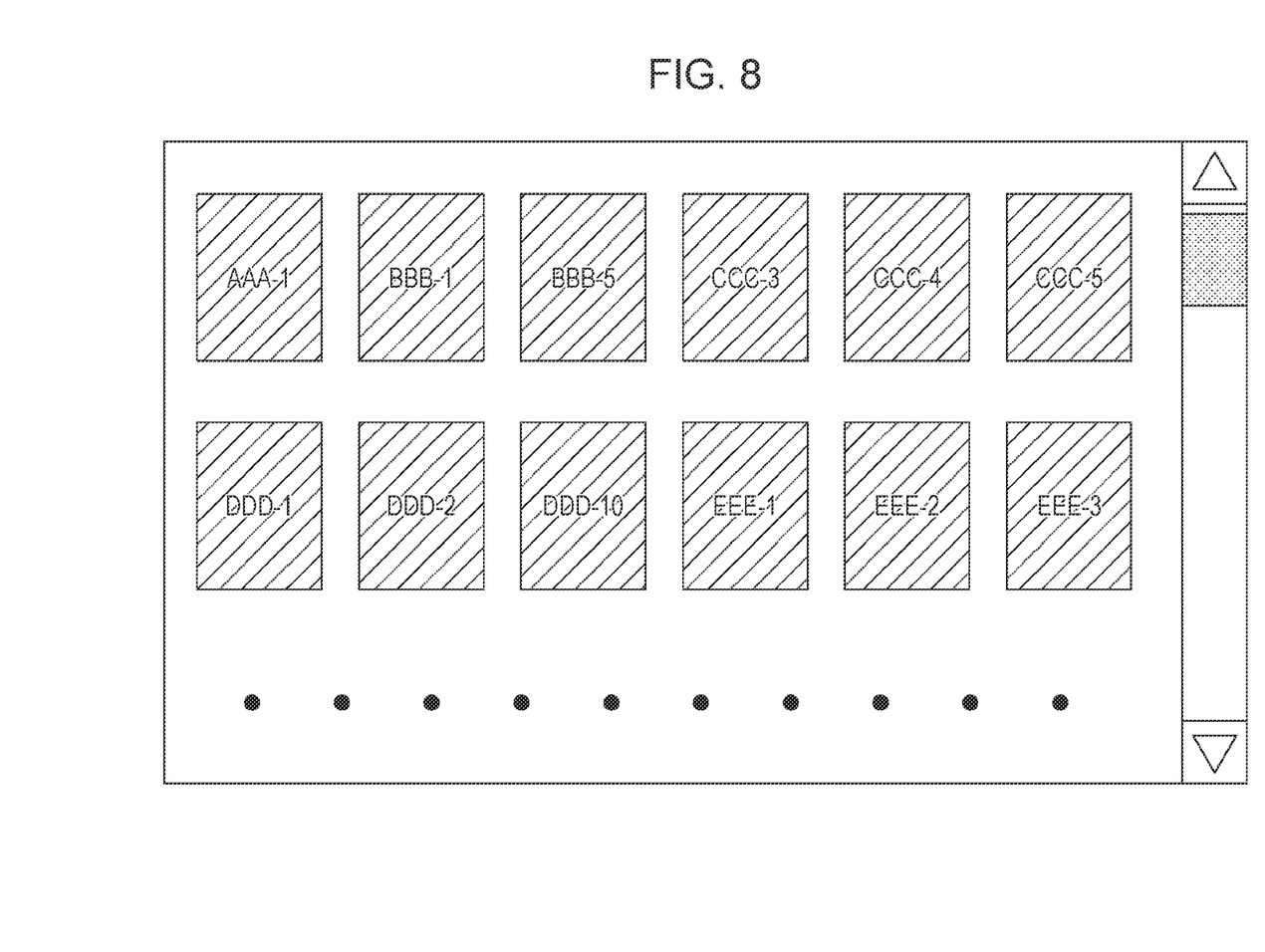
FIG. 8 is a schematic diagram illustrating an example in which the reduced-size image display unit extracts pages that satisfy a predetermined condition from individual print jobs and displays reduced-size images of the extracted pages when displaying reduced-size images for a combined job.

Alternatively, for each of print jobs having been combined by the print request combining unit 34, the reduced-size image display unit 38 may extract a page to be printed in accordance with a drawing command that satisfies a predetermined condition from to-be-printed pages specified in the print job and may display a reduced-size image of the extracted page. The predetermined condition may be, for example, that the drawing command represents a page including an image object, a watermark, or superimposed objects.

FIG. 8 is a schematic diagram illustrating an example in which the reduced-size image display unit 38 extracts pages that satisfy a predetermined condition from individual print jobs and displays reduced-size images of the extracted pages when displaying reduced-size images for a combined job. As illustrated in FIG. 8, the reduced-size image display unit 38 extracts pages to be printed in accordance with drawing commands that satisfy a predetermined condition from the individual print jobs having been combined and displays reduced-size images of the extracted pages.

Alternatively, for each of print jobs having been combined, the reduced-size image display unit 38 may extract the initial page of to-be-printed pages specified in the print job and also extract a page to be printed in accordance with a drawing command that satisfies a predetermined condition among the to-be-printed pages specified in the print job in the above-described manner and may display reduced-size images of these extracted pages.

Figure 9:
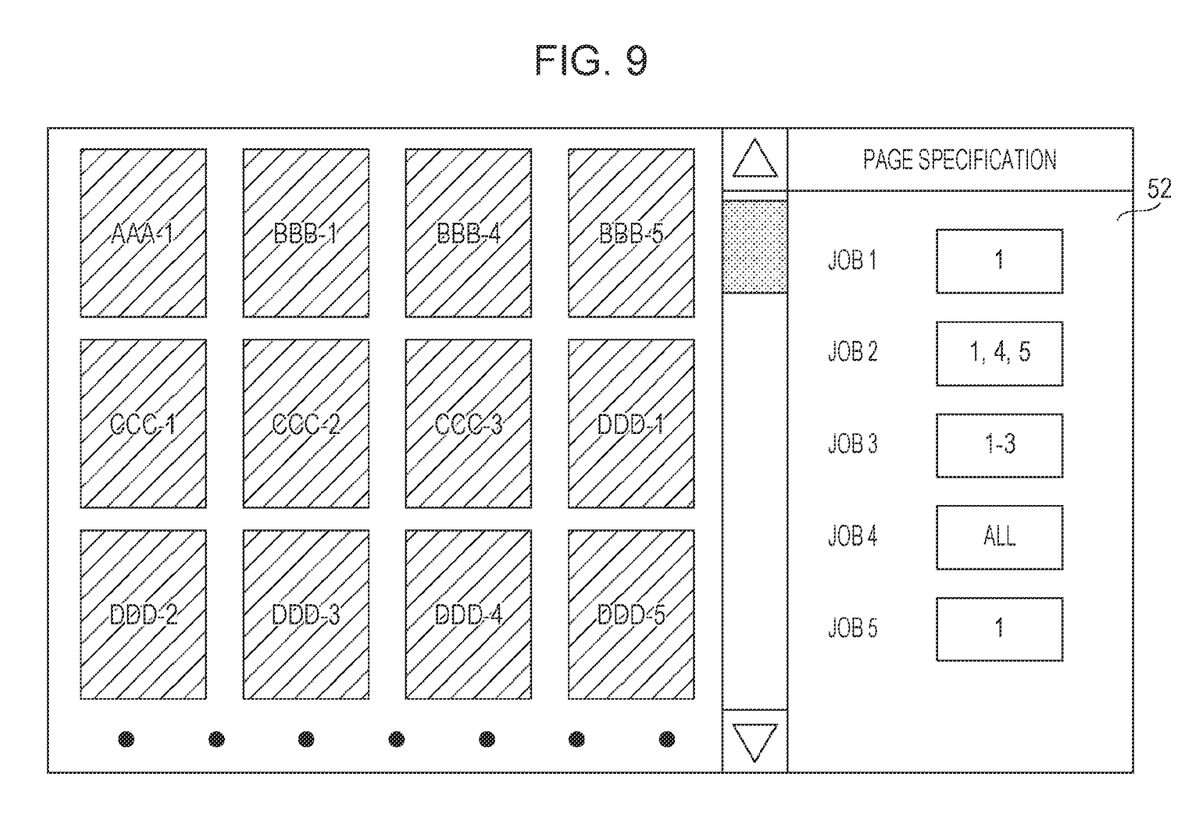
FIG. 9 is a schematic diagram illustrating an example in which the reduced-size image display unit displays reduced-size images of pages specified for individual print jobs.

Alternatively, for each of print jobs having been combined by the print request combining unit 34, the reduced-size image display unit 38 may accept an operation of specifying a to-be-extracted page from the print job, extract the specified page for the print job, and display a reduced-size image of the extracted page.

FIG. 9 is a schematic diagram illustrating an example in which reduced-size images of pages specified for individual print jobs are displayed by the reduced-size image display unit 38. As illustrated in FIG. 9, for example, reduced-size images of pages specified for individual print jobs in a page specification portion 52 are displayed.

Alternatively, the reduced-size image display unit 38 may display reduced-size images of the initial pages in the individual print jobs having been combined and of pages specified for the individual print jobs in the page specification portion 52 as well.

Figure 10:
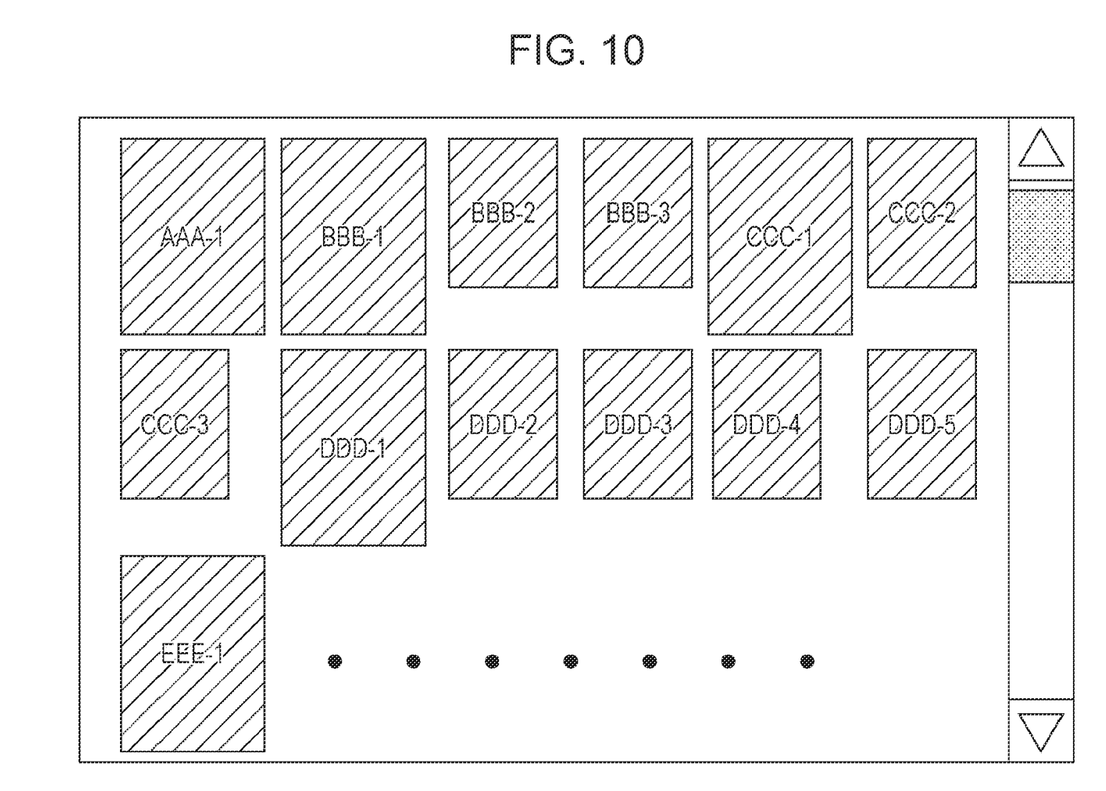
FIG. 10 is a schematic diagram illustrating an example in which the size of the displayed reduced-size image is changed in accordance with whether or not the corresponding page is the initial page in the corresponding print job that has been combined.
Figure 11:
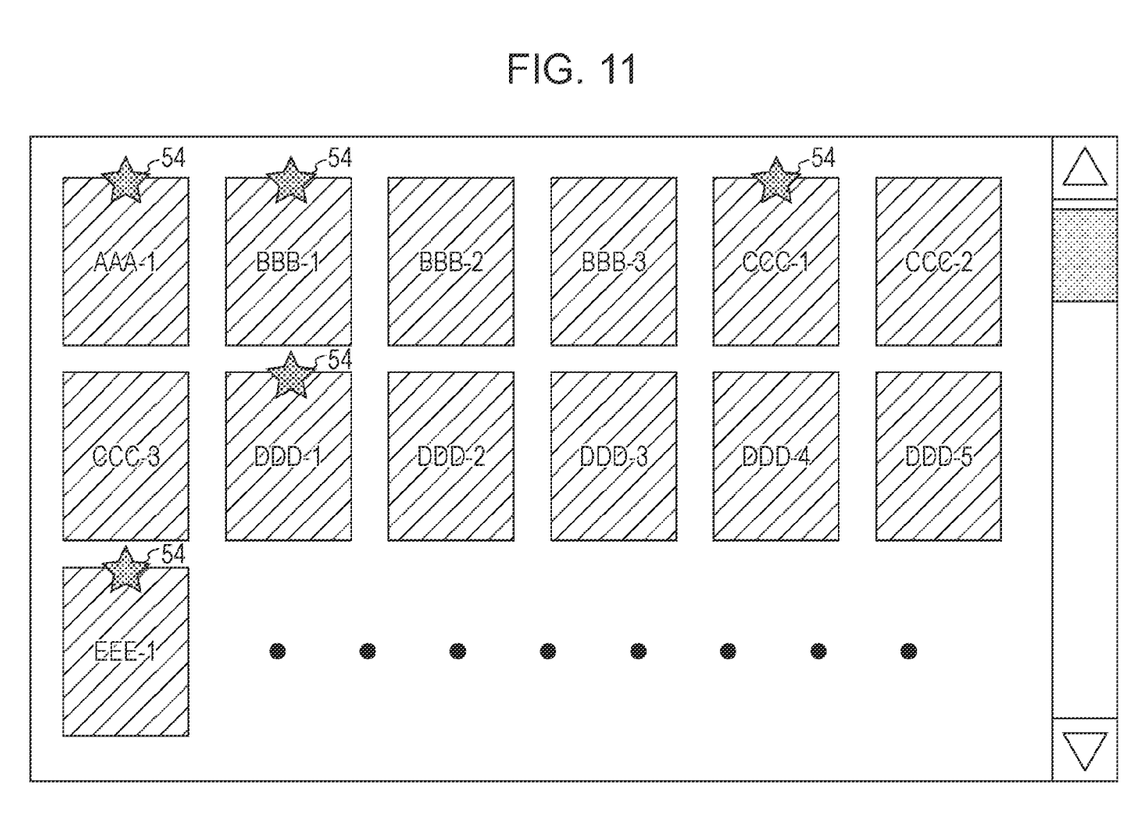
FIG. 11 is a schematic diagram illustrating an example in which a predetermined indicator is attached or is not attached to a reduced-size image in accordance with whether or not the corresponding page is the initial page in the corresponding print job that has been combined.

Alternatively, the reduced-size image display unit 38 may display, using a first display method, a reduced-size image of each initial page extracted from to-be-printed pages specified in a corresponding one of print jobs having been combined by the print request combining unit 34 and may display, using a second display method, a reduced-size image of each non-initial page extracted from to-be-printed pages specified in a corresponding one of the print jobs having been combined by the print request combining unit 34. For example, the first display method allows an image to be displayed more conspicuously than that displayed using the second display method. Note that pages to be displayed using the second display method may be all non-initial pages in the individual print jobs or may be limited to pages to be printed in accordance with drawing commands that satisfy a predetermined condition as described above.

FIG. 10 is a schematic diagram illustrating an example in which the size of each displayed reduced-size image is changed in accordance with whether or not the corresponding page is the initial page in a corresponding one of print jobs having been combined. In this way, the initial pages in the individual print jobs may be displayed in a first size, whereas non-initial pages in the individual print jobs may be displayed in a second size that is smaller than the first size.

FIG. 11 is a schematic diagram illustrating an example in which a predetermined indicator is attached or is not attached to a reduced-size image in accordance with whether or not the corresponding page is the initial page in a corresponding one of print jobs having been combined. In the example illustrated in FIG. 11, a predetermined indicator 54 is attached for the initial pages in the individual print jobs, whereas the predetermined indicator 54 is not attached for non-initial pages in the individual print jobs. The predetermined indicator 54 is displayed at the periphery of each reduced-size image of the initial page in the example illustrated in FIG. 11. Instead of this indicator, a frame that surrounds the reduced-size image representing the initial page may be used as the predetermined indicator.

Alternatively, reduced-size images of the initial pages in the individual print jobs may be displayed in a blinking manner, whereas reduced-size images of the non-initial pages in the individual print jobs may be displayed in the ordinary manner without blinking them.

Now, an operation performed by the image forming apparatus 4 according to this exemplary embodiment will be described.

Figure 12:
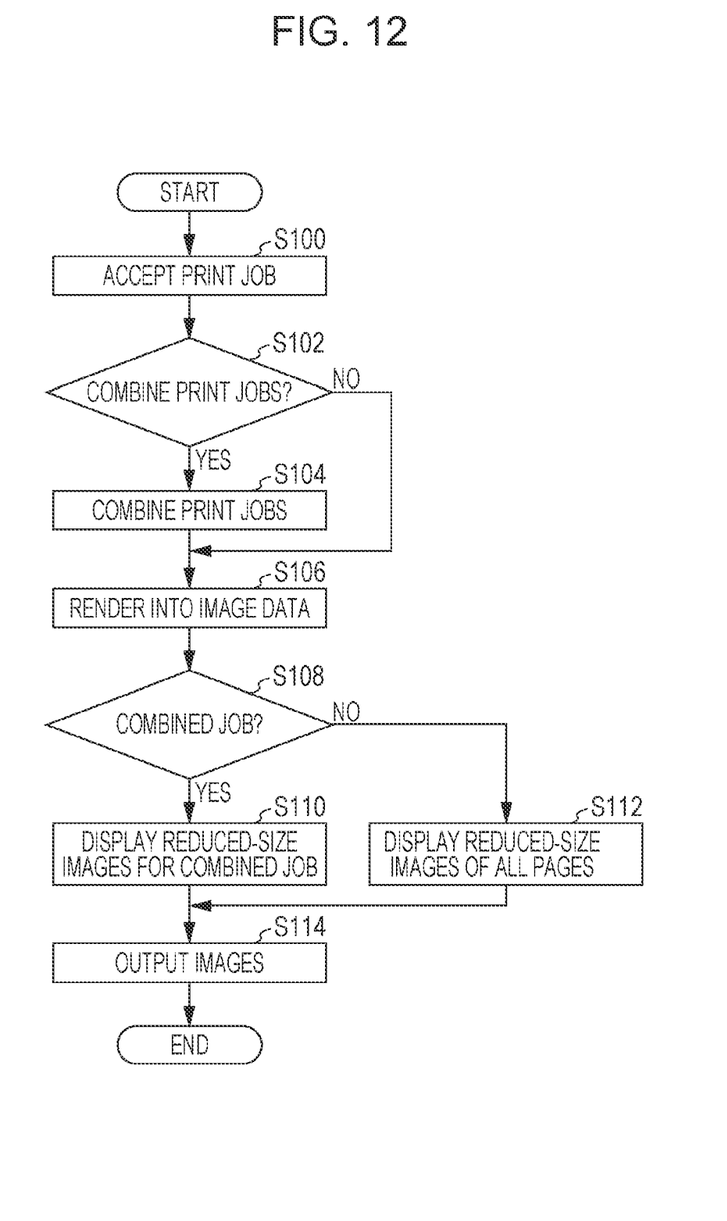
FIG. 12 is a flowchart illustrating an example of the operation performed by the image forming apparatus according to the exemplary embodiment of the present invention.

FIG. 12 is a flowchart illustrating an example of the operation performed by the image forming apparatus 4.

In step S100, the print request accepting unit 30 accepts a print job and stores the print job in the print request storage unit 32.

If an instruction to combine print jobs is input in step S102, the process proceeds to step S104. Otherwise, the process proceeds to step S106.

In step S104, the print request combining unit 34 combines multiple specified print jobs to generate one print job.

In step S106, the image rendering unit 36 generates image data in accordance with the print job.

It is determined whether or not the print job to be output is a combined job in step S108. If it is determined that the print job is a combined job, the process proceeds to step S110. Otherwise, the process proceeds to step S112.

In step S110, for each of the print jobs having been combined to constitute the combined job, the reduced-size image display unit 38 extracts a to-be-displayed page from to-be-printed pages specified in the print job and displays a reduced-size image of the extracted to-be-displayed page.

For example, the reduced-size image display unit 38 displays reduced-size images for a combined job in manners described above using FIGS. 5 and 7 to 11.

Note that the way of displaying reduced-size images may be specified for the combined job from among those described above, using the UI device 18, for example.

In step S112, the reduced-size image display unit 38 displays reduced-size images of all to-be-printed pages specified in the print job that is not a combined job.

In step S114, the image output unit 44 outputs images based on the print job under control of the print control unit 42. The images may be output after the output setting is modified using the reduced-size images displayed in step S110 or S112.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a print request combining unit configured to combine a plurality of print requests to generate one print request; and
   a reduced-size image display unit configured to extract at least one page, but not every page, to-be-displayed from each of the plurality of print requests, reduce image sizes of the extracted pages, and display the reduced-size images of the extracted pages,
   wherein the plurality of print requests includes a first print request and a second print request, and the reduced-size image display unit displays an initial page of the first print request using a first method that causes the initial page of the first print request to be displayed with an indicator and a non-initial page of the second print request using a second method that causes the non-initial page of the second print request to be displayed without the indicator.

2. The image forming apparatus according to claim 1, wherein the extracted pages include an initial page from each of the plurality of print requests, and the reduced size image display unit displays the reduced-size images of the extracted initial pages.

3. The image forming apparatus according to claim 1, wherein in response to a drawing command for the extracted pages not satisfying a condition, the extracted pages include an initial page from each of the plurality of print requests, and in response to the drawing command satisfying the condition, the reduced-size image display unit extracts at least one page following an initial page of at least one of the print requests.

4. The image forming apparatus according to claim 1, wherein in response to a result obtained by comparing an initial page of a first print request of the plurality print requests with an initial page of a second print request of the plurality of print requests satisfying a condition, the reduced-size image display unit displays a reduced-size image of a page following an initial page of the second print request.

5. The image forming apparatus according to claim 3, wherein the reduced-size image display unit is configured to display, using a first display method, the one or more initial pages extracted from the plurality of print requests having been combined by the print request combining unit, and to display, using a second display method, the one or more non-initial pages extracted from the plurality of print requests having been combined by the print request combining unit.

6. The image forming apparatus according to claim 4, wherein the reduced-size image display unit is configured to display, using a first display method, the one or more initial pages extracted from the plurality of print requests having been combined by the print request combining unit, and to display, using a second display method, the one or more non-initial pages extracted from the plurality of print requests having been combined by the print request combining unit.

7. The image forming apparatus according to claim 5, wherein the reduced-size image display unit is configured to display, in a first size, the one or more initial pages extracted from the plurality of print requests having been combined by the print request combining unit and, to display, in a second size that is smaller than the first size, the one or more non-initial pages extracted from the plurality of print requests having been combined by the print request combining unit.

8. The image forming apparatus according to claim 6, wherein the reduced-size image display unit is configured to display, in a first size, the one or more initial pages extracted from the plurality of print requests having been combined by the print request combining unit and, to display, in a second size that is smaller than the first size, the one or more non-initial pages extracted from the plurality of print requests having been combined by the print request combining unit.

9. The image forming apparatus according to claim 5, wherein the reduced-size image display unit is configured to display, along with a predetermined indicator, the one or more initial pages extracted from the plurality of print requests having been combined by the print request combining unit, to display, without the predetermined indicator, the one or more non-initial pages extracted from the plurality of print requests having been combined by the print request combining unit.

10. The image forming apparatus according to claim 6, wherein the reduced-size image display unit is configured to display, along with a predetermined indicator, the one or more initial pages extracted from the plurality of print requests having been combined by the print request combining unit, to display, without the predetermined indicator, the one or more non-initial pages extracted from the plurality of print requests having been combined by the print request combining unit.

11. The image forming apparatus according to claim 5, wherein the reduced-size image display unit is configured to display, in a blinking manner, the one or more initial pages extracted from the plurality of print requests having been combined by the print request combining unit and, and to display, in a non-blinking manner, the one or more non-initial pages extracted from the sets of to-be-printed pages specified in the plurality of print requests having been combined by the print request combining unit.

12. The image forming apparatus according to claim 6, wherein the reduced-size image display unit is configured to display, in a blinking manner, the one or more initial pages extracted from the plurality of print requests having been combined by the print request combining unit and, and to display, in a non-blinking manner, the one or more non-initial pages extracted from the sets of to-be-printed pages specified in the plurality of print requests having been combined by the print request combining unit.

13. The image forming apparatus according to claim 1, wherein the reduced-size image display unit is configured to extract a page to be printed in accordance with a drawing command that satisfies a condition from each of the plurality of print requests having been combined by the print request combining unit and, to display reduced-size images of the extracted pages.

14. The image forming apparatus according to claim 1, further comprising
a page specifying unit configured to specify at least one page to be extracted from each of the plurality of print requests having been combined by the print request combining unit,
wherein the reduced-size image display unit is configured to extract pages specified by the page specifying unit from the plurality of print requests having been combined by the print request combining unit, and display reduced-size images of the extracted pages.

15. The image forming apparatus according to claim 1, further comprising an output setting unit configured to allow a combination order of the plurality of print requests in the one generated print request to be changed.

16. An image forming apparatus comprising:
a print request combining unit configured to combine a plurality of print requests to generate one print request; and
a reduced-size image display unit configured to extract at least one page, but not every page, to-be-displayed from each of the plurality of print requests, reduce image sizes of the extracted pages, and display the reduced-size images of the extracted pages;
wherein the plurality print requests includes a first print request and a second print request, and the reduced-size image display unit displays an initial page of the first print request using a first method that causes the initial page of the first print request to be displayed with a first size, and a non-initial page of the second print request using a second method that causes the non-initial page of the second print request to be displayed with a second size that is different from the first size.

17. An image forming apparatus comprising:
a print request combining unit configured to combine a plurality of print requests to generate one print request; and
a reduced-size image display unit configured to extract at least one page, but not every page, to-be-displayed from each of the plurality of print requests, reduce image sizes of the extracted pages, and display the reduced-size images of the extracted pages,
wherein the plurality of print requests includes a first print request and a second print request, and the reduced-size image display unit displays an initial page of the first print request using a first method that causes the initial page of the first print request to be displayed in a blinking manner, and a non-initial page of the second print request using a second method that causes the non-initial page of the second print request to be displayed in a non-blinking manner.

* * * * *